United States Patent
Kim et al.

(10) Patent No.: US 9,542,740 B2
(45) Date of Patent: Jan. 10, 2017

(54) METHOD FOR DETECTING DEFECT IN PATTERN

(71) Applicant: Samsung Electronics Co., Ltd., Suwon-Si, Gyeonggi-Do (KR)

(72) Inventors: Ki-Hyun Kim, Seoul (KR); Kai-Yuan Chi, Yongin-si (KR); Dmitry Vengertsev, Hwaseong-si (KR); Seung-Hune Yang, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 140 days.

(21) Appl. No.: 14/331,899

(22) Filed: Jul. 15, 2014

(65) Prior Publication Data

US 2015/0131891 A1    May 14, 2015

(30) Foreign Application Priority Data

Nov. 14, 2013  (KR) .................. 10-2013-0138475

(51) Int. Cl.
*G06K 9/00* (2006.01)
*G06T 7/00* (2006.01)

(52) U.S. Cl.
CPC ..... *G06T 7/001* (2013.01); *G06T 2207/10061* (2013.01); *G06T 2207/30148* (2013.01)

(58) Field of Classification Search
CPC ............ G01K 3/04; G06T 2207/10061; G06T 2207/30148; G06T 7/001
USPC ........................................................ 382/144
See application file for complete search history.

(56) References Cited

U.S. PATENT DOCUMENTS

| | | | |
|---|---|---|---|
| 5,448,650 A | * | 9/1995 | Desai ................... G06T 7/0002 348/126 |
| 6,990,233 B2 | | 1/2006 | Park et al. |
| 7,764,824 B2 | | 7/2010 | Karsenti |
| 7,996,813 B2 | | 8/2011 | Hatano et al. |
| 8,103,984 B1 | | 1/2012 | Pierrat |
| 8,312,408 B2 | | 11/2012 | Itagaki |
| 8,413,081 B2 | | 4/2013 | Ye et al. |

(Continued)

FOREIGN PATENT DOCUMENTS

| | | |
|---|---|---|
| KR | 100734533 B1 | 7/2007 |
| KR | 100832660 B1 | 6/2008 |

(Continued)

OTHER PUBLICATIONS

O. Deniz, et al., "Face recognition using Histograms of Oriented Gradients", Pattern Recoginition Letters 32 (2011), pp. 1598-1603.

(Continued)

*Primary Examiner* — Manuchehr Rahmjoo
(74) *Attorney, Agent, or Firm* — Harness, Dickey & Pierce, P.L.C.

(57) ABSTRACT

Provided is a method of detecting a defect of a pattern using vectorization to increase accuracy and efficiency in OPC modeling and OPC verification. The method includes acquiring a target layout image associated with a target pattern, acquiring a pattern image associated with a pattern formed on a substrate, extracting an edge image from the pattern image, producing a first vector form based on the target layout image, producing a second vector form based on the edge image, and comparing the first vector form with the second vector form.

11 Claims, 12 Drawing Sheets

(56) References Cited

U.S. PATENT DOCUMENTS

| | | |
|---|---|---|
| 2008/0183323 A1 | 7/2008 | Menadeva et al. |
| 2008/0189673 A1 | 8/2008 | Ying |
| 2009/0077524 A1* | 3/2009 | Nagamura ................ G03F 1/14 716/54 |
| 2010/0138801 A1 | 6/2010 | Matsuoka et al. |
| 2011/0155904 A1* | 6/2011 | Hotta ................ G03F 7/70466 250/307 |
| 2012/0243772 A1 | 9/2012 | Yamanaka |

FOREIGN PATENT DOCUMENTS

| | | |
|---|---|---|
| KR | 20110002359 A | 1/2011 |
| KR | 101033225 B1 | 5/2011 |

OTHER PUBLICATIONS

Jamie D. J. Shotton, "Contour and Texture for Visual Recognition of Object Categories", Queens' College, University of Cambridge, Mar. 2007.

\* cited by examiner

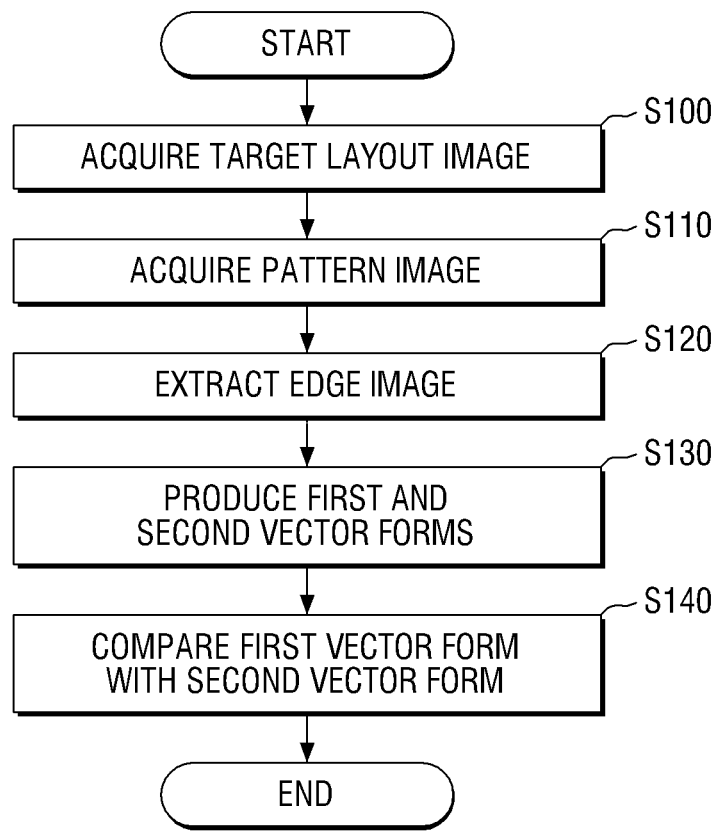

METHOD FOR DETECTING DEFECT IN PATTERN

CROSS-REFERENCE TO RELATED APPLICATION

This application claims priority from Korean Patent Application No. 10-2013-0138475 filed on Nov. 14, 2013 in the Korean Intellectual Property Office, and all the benefits accruing therefrom under 35 U.S.C. 119, the contents of which in its entirety are herein incorporated by reference.

BACKGROUND

1. Field

Example embodiments of the inventive concepts relate to a method of detecting a defect of a pattern and/or modifying a layout image to compensate for the detected defects.

2. Description of the Related Art

It may be desirable to transfer a pattern formed on a mask onto a wafer through a lithography process in the same layout as the layout that was designed. In a region having a complex mask pattern or a region having a pattern with sharply changing sizes and line widths, however, the lithography process may be affected by diffraction of light in adjacent patterns. As a result, the layout of the transferred pattern may be different from the designed layout. In order to avoid this phenomenon, a region may be intentionally distorted when designing a mask in an optical proximity correction (OPC) process. However, conventional OPC processes may be inefficient and/or may not sufficiently compensate for diffracted light.

SUMMARY

Example embodiments of the inventive concepts provide a method for detecting a defect of a pattern using vectorization to increase accuracy and efficiency in OPC modeling and OPC verification.

The above and other objects of example embodiments of the inventive concepts will be described in or be apparent from the following description of the preferred embodiments.

According to one or more example embodiments of the inventive concepts, there is provided a method for detecting a defect of a pattern.

In at least one example embodiment, the method including acquiring a target layout image for a target pattern, acquiring a pattern image for a pattern formed on a substrate, extracting an edge image from the pattern image, producing a first vector form from the target layout image, producing a second vector form from the edge image, and comparing the first vector form with the second vector form.

According to other example embodiments of the inventive concepts, there is provided a method for detecting a defect of a pattern.

In at least one example embodiment, the method includes acquiring a pattern image for a pattern formed on a substrate, extracting an edge image from the pattern image, producing a vector form from the edge image, extracting vectors being in directions of 0, ±45, ±90, ±135, or 180 degrees from the vector form, and counting the number of the extracted vectors.

At least one example embodiment relates to a method of modifying a layout image to compensate for defects occurring when transferring a target pattern associated with the layout image to a substrate.

In some example embodiments, the method includes acquiring the layout image associated with the target pattern; producing an edge image based on a physical pattern formed on the substrate, the physical pattern having been formed based on the target pattern; determining an accuracy of the physical pattern based on straight lines in the layout image and the edge image; and modifying the layout image based on a result of the determining.

In some example embodiments, the producing the edge image includes extracting a contour of the physical pattern and smoothing the extracted contour to reduce jagged edges therein.

In some example embodiments, the determining the accuracy of the physical pattern includes, producing first vector maps based on the layout image and the edge image, the first vector maps having, for each first pixel therein, first vectors indicating a direction of second pixels adjacent thereto; producing second vector maps, each second vector map associated with one of the layout image and the edge image, by performing, for each first pixel in an associated one of the first vector maps, vector addition, on the vectors originating therefrom to produce second vectors associated with a respective first pixel in one of the layout image and the edge image; and comparing the second vector map associated with the layout image and the second vector map associated with the edge image.

In some example embodiments, directions of each of the second vectors are one of 0, ±45, ±90, ±135, or 180 degrees with respect to their associated first pixels.

In some example embodiments, the comparing the second vector map associated with the layout image and the second vector map associated with the edge image includes, comparing, for each of the directions, a number of the second vectors associated with the layout image and a number of the second vectors associated with the edge image.

BRIEF DESCRIPTION OF THE DRAWINGS

The above and other features and advantages of the present inventive concept will become more apparent by describing in detail preferred embodiments thereof with reference to the attached drawings in which:

FIG. 2 is a flowchart illustrating a method of detecting a defect of a pattern according to some example embodiments of the inventive concepts;

DETAILED DESCRIPTION OF THE EMBODIMENTS

Figure 1:
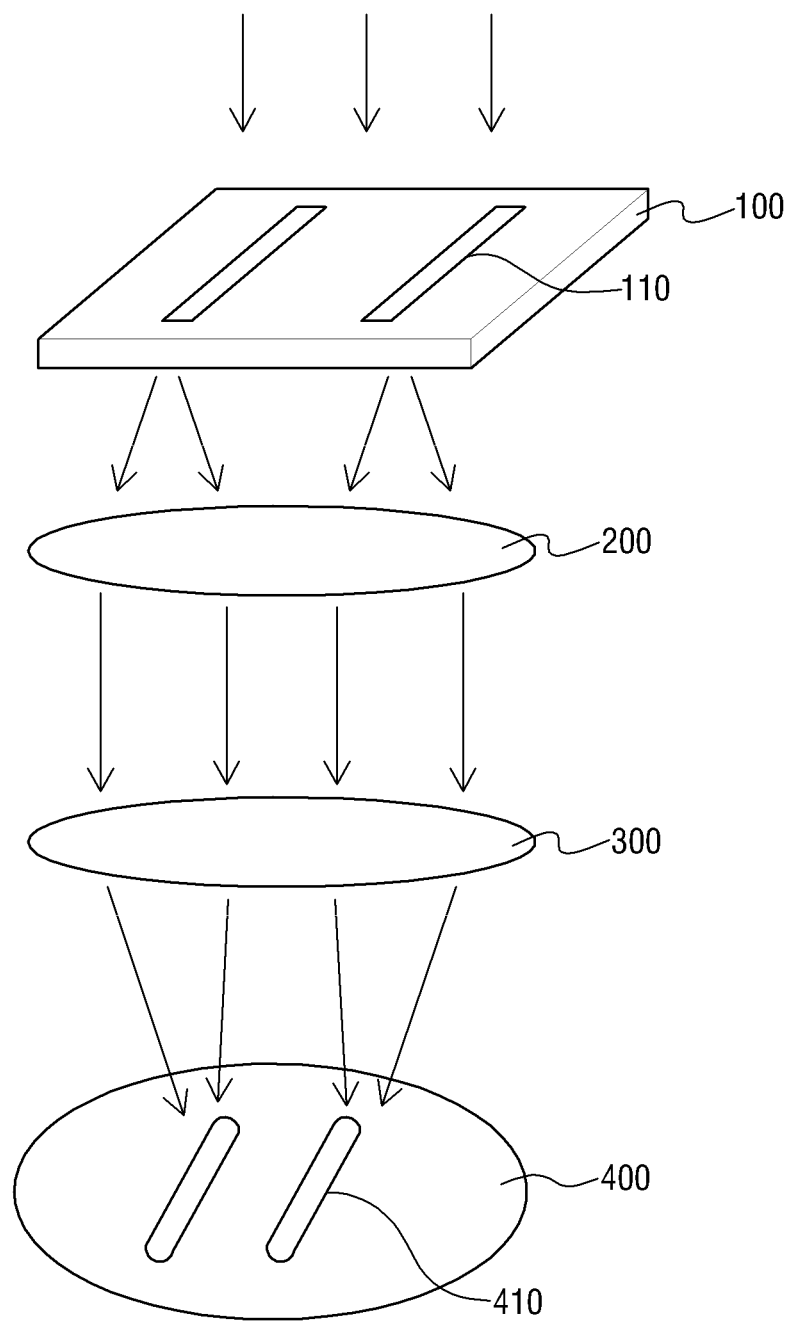
FIG. 1 illustrates a lithography apparatus according to example embodiments.

Example embodiments of the inventive concepts will now be described more fully hereinafter with reference to the accompanying drawings, in which some example embodiments of the inventive concepts are shown. These inventive concepts may, however, be embodied in different forms and should not be construed as limited to the embodiments set forth herein. Rather, these example embodiments are provided so that this disclosure will be thorough and complete, and will filly convey the scope of the inventive concepts to those skilled in the art. The same reference numbers indicate the same components throughout the specification. In the attached figures, the thickness of layers and regions is exaggerated for clarity.

Detailed illustrative example embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

Example embodiments of the inventive concepts will be described with reference to perspective views, cross-sectional views, and/or plan views, in which preferred embodiments of the inventive concept are shown. Thus, the profile of an example view may be modified according to manufacturing techniques and/or allowances. That is, the example embodiments of the inventive concepts are not intended to limit the scope of the inventive concepts but cover all changes and modifications that can be caused due to a change in manufacturing process. Thus, regions shown in the drawings are illustrated in schematic form and the shapes of the regions are presented simply by way of illustration and not as a limitation.

The following description of a method of detecting a defect of a pattern is based on utilization of image vectorization for increasing accuracy and efficiency in OPC modeling and OPC verification. In a lithography process, in order to compensate for an optical proximity effect (OPE) occurring when a pattern is transferred, a target pattern layout designed to transfer a pattern is OPC corrected. In order to verify whether the resultant pattern transferred using the OPC corrected layout coincides with the target pattern layout, OPC verification is performed.

Before describing methods for detecting a defect of a pattern according to some example embodiments of the inventive concepts, a lithography apparatus will now be described briefly.

FIG. 1 illustrates a lithography apparatus according to example embodiments.

Referring to FIG. 1, a lithography apparatus used in a lithography process may include a mask 100, an expanding lens 200, a focusing lens 300, and a substrate 400.

An opening 110 used for a lithography process is formed on the mask 100. The opening 110 is formed based on a pattern 410 to be transferred onto the substrate 400. However, conventionally, the pattern 410 formed on the substrate 400 may have a different shape from the opening 110 because edges of the opening 110 may not be accurately transferred to the pattern 410 formed on the substrate 400 due to diffraction of light during the lithography process. Therefore, it may be desirable to compensate for this phenomenon by changing the shape of the opening 110 formed on the mask 100.

The expanding lens 200 may expand the light passing the opening 110 of the mask 100, and the focusing lens 300 may focus the expanded light onto the substrate 400.

As described above, the pattern 410 formed on the substrate 400 may have distorted edges as compared with the shape of the opening 110 of the mask 100. Accordingly, in order to compensate for this phenomenon, the shape of the opening 110 of the mask 100 may be changed using OPC technology.

In OPC modeling and OPC verification, it may be desirable to detect a defect of the pattern 410 transferred onto the substrate 400 (for example, a broken, bridged, collapsed or defocused state of the pattern 410), which will be below described.

FIG. 2 is a flowchart illustrating a method of detecting a defect of a pattern according to some example embodiments of the inventive concepts.

Referring to FIG. 2, a processor, for example, the processor included in the system 4100 discussed below with reference to FIG. 8, may execute a method of detecting a defect of a pattern, as described herein with reference to FIG. 2.

In operation S100, the processor may acquire a target layout image for a target pattern. The acquiring the target layout image may include acquiring the target layout image by simulation. For example, the processor may acquire the target layout image performing optical simulation or performing a target layout smoothing process.

The target pattern, used to acquire the target layout image, may be a final result pattern to be transferred onto a substrate through a lithography process such that the target pattern is a pattern desired to be utilized in a product.

In operation S110, the processor may instruct a scanner to acquire a pattern image for the pattern formed on the substrate. The pattern image is an image of the pattern that is transferred onto the substrate through a lithography process. For example, the processor may acquire the pattern image using a scanning electron microscope (SEM) to scan a photoresist layer of the substrate.

Figure 3A:
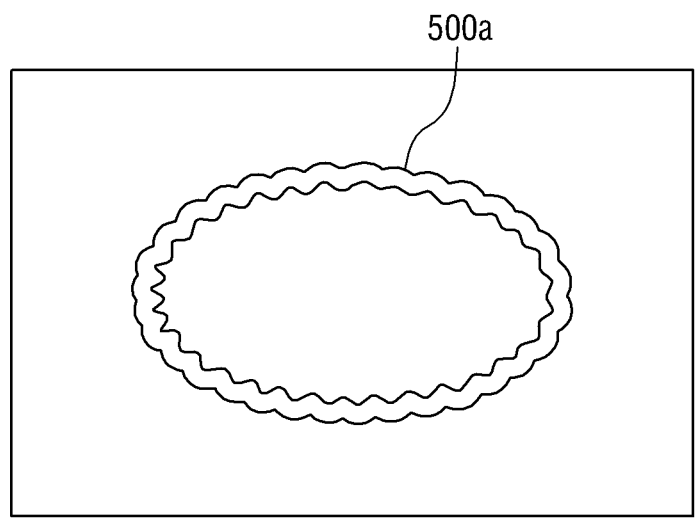
FIG. 3A illustrates a pattern image.

FIG. 3A illustrates a pattern image according to example embodiments.

Referring to FIG. 3A, a pattern image 500a may be acquired by SEM scanning a substrate (e.g. a photoresist layer of the substrate). Although, the pattern image 500a illustrated in FIG. 3A has an elliptical shape, the pattern image may have more complex, various shapes.

Referring back to FIG. 2, in operation S120, the processor may extract an edge image from the pattern image. The edge image may be formed by correcting the pattern image and extracting only a contour thereof. The edge image may be utilized to detect defects present in a pattern by making the pattern image simple and clear prior to vectorizing the pattern image, rather than by directly performing a complex vectorization process, and comparing the simple and clear pattern image with the target layout image.

The contour of the pattern image may be extracted using image correction technology. For example, an image software program may be used in the image correction technology.

Figure 3B:
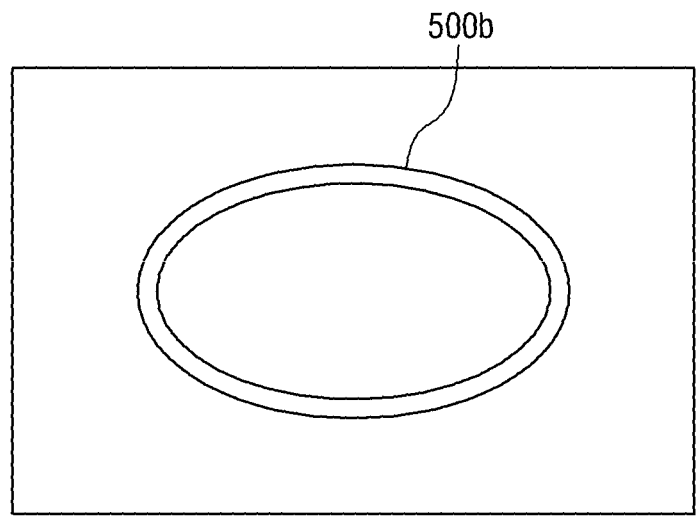
FIG. 3B illustrates an edge image.

FIG. 3B illustrates an edge image according to example embodiments.

Referring to FIG. 3B, an edge image 500b is illustrated. While the edge image 500b illustrated in FIG. 3B has an elliptical shape, the actual edge image may have more complex, various shapes.

Referring back to FIG. 2, in operation S130, the processor may produce a first vector form from the target layout image and a second vector form from the edge image.

The first vector form may be produced using a vector heading from the center of a pixel of the target layout image to the center of another pixel adjacent to the pixel after partitioning the target layout image on the basis of pixels. Likewise, the second vector form may be produced using a vector heading from the center of a pixel of the edge image to the center of another pixel adjacent to the pixel after partitioning the edge image on the basis of pixels.

In detail, the first and second vector forms may be produced by forming a vector heading from a first pixel to a second pixel and vectorizing all vectors being in input and output directions with respect to one pixel by vector addition. The first pixel may be any selected or chosen pixel and the second pixel may include all pixels adjacent to the first pixel such that a first pixel is surrounded by 8 pixels corresponding to the second pixel. The first pixel may be a black pixel and the second pixel may be a white pixel such that the center of the black pixel may be an initial point of a vector and the center of the white pixel may be a terminal point of the vector, but example embodiments of the inventive concepts are not limited thereto.

Alternatively, in forming individual vectors to produce the first and second vector forms, the first and second vector forms may be produced by forming only vectors being in 0, 90, 180, or 270 degrees with respect to the first pixel, which will be described in more detail below with reference to FIGS. 4A and 4B.

Figure 4A:
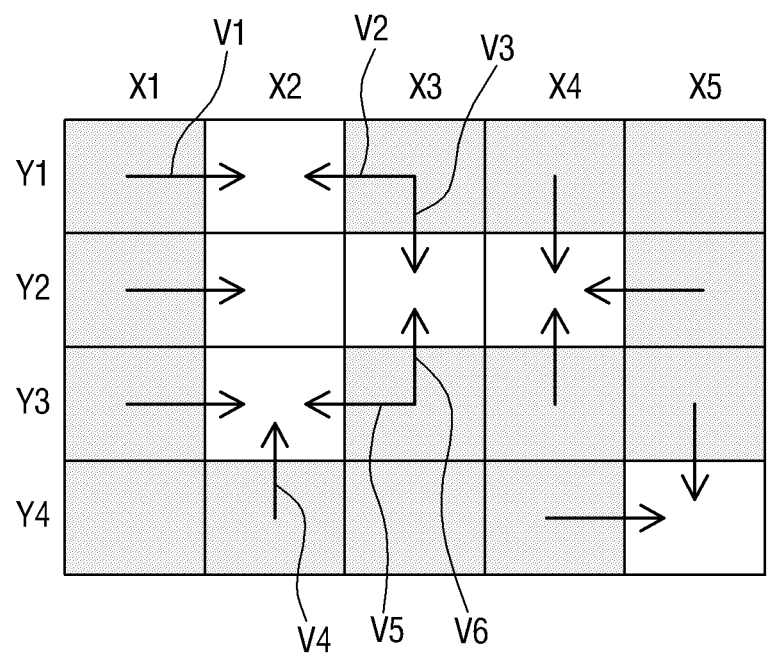
FIGS. 4A and 4B illustrate vector forms.
Figure 4B:
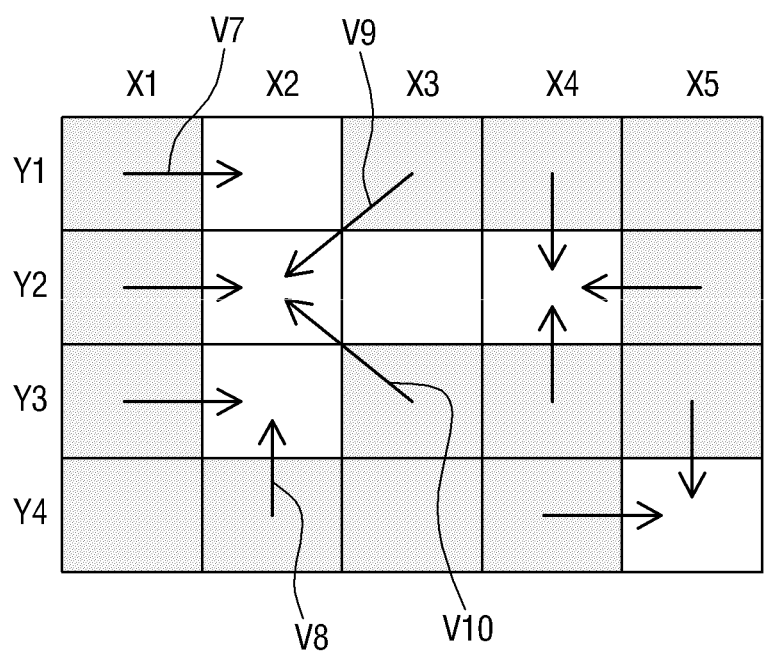

FIGS. 4A and 4B illustrate vector forms according to example embodiments.

Referring to FIG. 4A, in FIG. 4A the individual vectors are vectors having directions of 0, 90, 180, or 270 degrees on the basis of the first pixel, the center of the black pixel is an initial point of a vector, and the center of the white pixel is a terminal point of the vector, however, example embodiments are not limited thereto.

As described above, in some example embodiments, the center of the black pixel may be an initial point of a vector and the center of the white pixel may be a terminal point of the vector. In the example illustrated in FIG. 4A, the first pixel (X1, Y1) is a black pixel, therefore, the center of the first pixel (X1, Y1) is an initial point of a vector V1. Likewise, since the second pixel (X2, Y1) is a white pixel, the center of the second pixel (X2, Y1) is a terminal point of the vector V1. In addition, since both the first pixel (X1, Y1) and a third pixel (X1, Y2) are black pixels, a vector heading from the first pixel (X1, Y1) to the third pixel (X1, Y2) is not formed, and only the vector V1 being in a direction of 0 degree is formed with respect to the first pixel (X1, Y1).

Since a fourth pixel (X2, Y4) is a black pixel surrounded on three sides by other black pixels and a white fifth pixel (X2, Y3), the black fourth pixel (X2, X4) only has a vector V4 originating therefrom in a direction of 90 degrees toward the fifth pixel (X2, Y3). Since a sixth pixel (X3, Y1) is a black pixel surrounded by a white second pixel (X2, Y1) and white a seventh pixel (X3, Y2), the black sixth pixel (X3, Y1) has a vector V2 originating therefrom in a direction of 180 degrees and a vector V3 originating therefrom in a direction of 270 degrees with respect to the sixth pixel (X3, Y1). Since an eighth pixel (X3, Y3) is a black pixel surrounded by the white fifth pixel (X2, Y3) and the white seventh pixel (X3, Y2), the black eighth pixel (X3, Y3) has a vector V5 originating therefrom in a direction of 180 degrees and a vector V6 originating therefrom in a direction of 90 degrees respect to the eighth pixel (X3, Y3).

Referring to FIG. 4B, FIG. 4B illustrates a process of vectorizing individual vectors by vector addition to produce the first and second vector forms.

The vectorizing may include performing vector operations on all vectors being in input and output directions with respect to a pixel by vector addition.

For example, all of the vectors illustrated of FIG. 4A that are associated with the first pixel (X1, Y1) may be added. Since only one vector (e.g. vector V1) in a direction of 0 degree exists for the first pixel (X1, Y1), even after the vector addition, only a vector V7 being in a direction of 0 degree remains.

With respect to the second pixel (X2, Y1), as illustrated in FIG. 4A, two vectors V1 and V2 exist are input from opposite directions to the second pixel (X2, Y1). Therefore, when the vectors V1 and V2 are added the result is zero. Therefore, no vector exists for the second pixel (X2, Y1).

With respect to the sixth pixel (X3, Y1), two vectors V2 and V3 exist, and the vectors V2 and V3 are added to yield a vector V9 being in a direction of −135 degrees.

In the above-described manner, vector addition is performed on all black pixels and all white pixels, yielding the first vector form for the target layout image and the second vector form for the edge image. As the result, the vectors yielded after performing the vector addition are vectors being in directions of 0, ±45, ±90, ±135, or ±180 degrees.

Referring back to FIG. 2, after forming the first and second vector forms, in operation S140, the processor may compare the first vector form and the second vector form to detect a defect of the pattern.

The comparing of the first vector form with the second vector form may include counting the number of vectors resulting from vector addition performed on the first and second vector forms for each direction.

Figure 5:
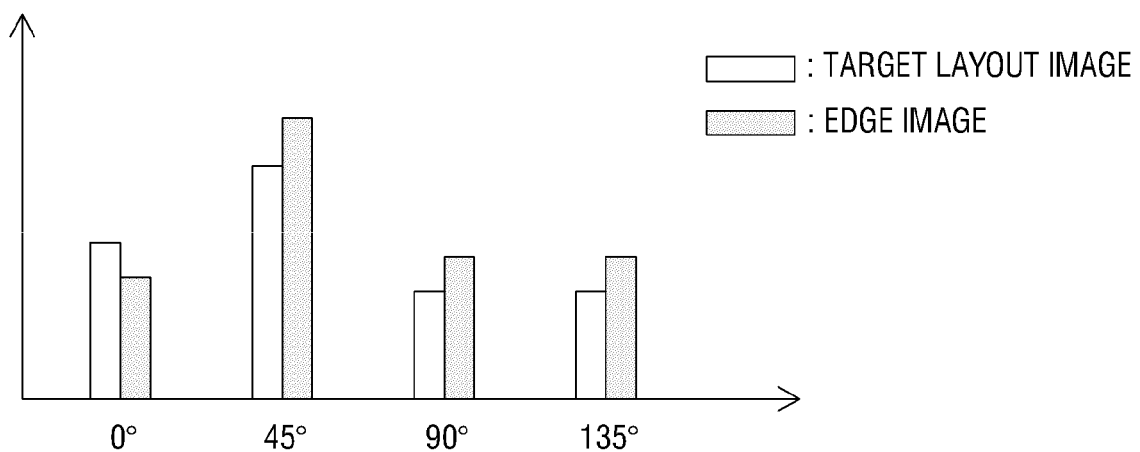
FIG. 5 is a graph comparing the number of vectors of a target layout image with the number of vectors of an edge image.

FIG. 5 is a graph comparing the number of vectors of a target layout image with the number of vectors of an edge image.

Referring to FIG. 5, the number of vectors in various directions from 0 degree is counted from the first vector form produced from the target layout image. Likewise, the number of vectors in various directions from 0 degree is counted from the second vector form produced from the edge image. The numbers of vectors may be compared, and a defect of the pattern may be detected based on the comparison result.

For example, assuming that the target pattern is in the shape of vertical lines repeatedly arranged in parallel, the target layout image may also be an image having a pattern that is in the shape of vertical lines repeatedly arranged in parallel. Since the edge image is formed from an image of an actual pattern formed on a substrate, it may be an image similar to the pattern shaped such that vertical lines are repeatedly arranged in parallel or may have a different pattern due to a defect of the pattern.

In order to detect a defect of a pattern from the edge image, the first and second vector forms are used. Assuming that the pattern is rendered as a black pixel on the image, white pixels are rendered around the pattern of the image, because the pattern of black pixels are vertical lines, vectors formed from the first vector form produced from the target layout image are mostly in directions of 0 and 180 degrees, which is because white pixels exist in directions of 0 and 180 degrees based on the black pixel.

Therefore, for the total number (N1_total) of all vectors, the pattern is closer to the target pattern as a sum of the number (N1_0) of vectors being in the direction of 0 degree and the number (N1_180) of vectors being in the direction of 180 degrees increases. Accordingly, equation 1 can be given as:

$$\text{Accuracy of pattern} = (N1\_0 + N1\_180)/N1\_\text{total} \quad \text{(Equation 1)}$$

Next, for the second vector form produced from the edge image, the total number (N2_total) of all vectors is counted, the number (N2_0) of vectors in the direction of 0 degree and the number (N2_180) of vectors in the direction of 180 degrees are counted, thereby determining the presence of a defect in the pattern using Equation 1.

As confirmed from experimental results, when Equation 1 yields a result smaller than 0.6, a pattern may not be formed, or a collapsed pattern or a defocused pattern may be formed. In addition, when Equation 1 yields a result in a range of 0.6 to 0.75, the resulting pattern may be broken, bridged, or moderately defocused state. In addition, when Equation 1 yields a result in a range of 0.75 to 0.8, the resulting pattern may be slightly broken or have a bridged state. Further, when Equation 1 yields a result greater than 0.8, defects may be absent from the pattern.

In the above-described manner, the presence or absence of a defect can be detected by counting the numbers of vectors for the respective directions according to the shape of the pattern.

While example embodiments have been described for a pattern that is in the shape of vertical lines repeatedly arranged in parallel, a defect of a pattern shaped such that horizontal lines are repeatedly arranged can be detected in a similar manner by counting the numbers of vectors being in a direction of 90 degrees and the numbers of vectors being in a direction of 270 degrees.

In the same manner as described above, a defect of a pattern can be automatically detected from the edge image. That is to say, the first and second vector forms are automatically produced, and the numbers of vectors for the respective directions of the first and second vector forms are counted and compared with each other, thereby determining whether a defect exists in the pattern. Additionally, OPC models can be corrected according to the presence or absence of a defect in a pattern.

According to the method of detecting a defect of a pattern according to example embodiments of the inventive concepts, the number of review images required for OPC model correction may be reduced.

Figure 6:
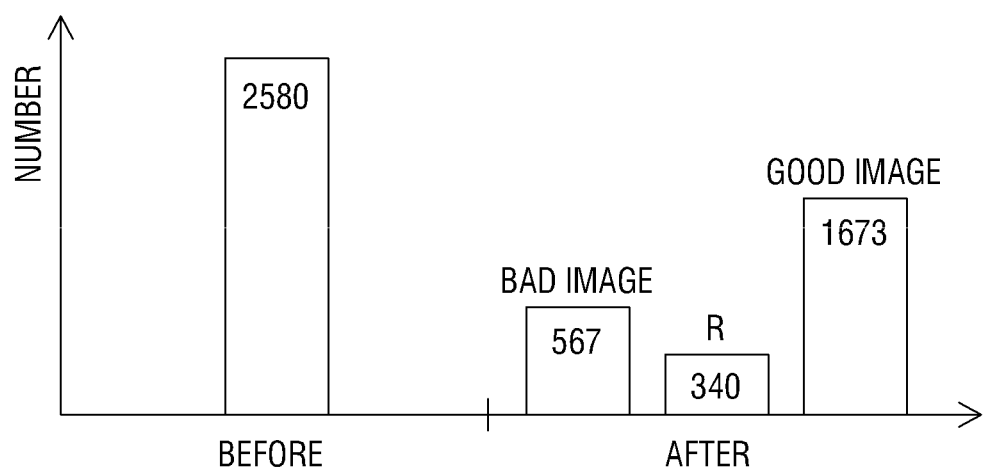
FIG. 6 is a graph illustrating data for explaining an effect exerted by a method of detecting a defect of a pattern according to an example embodiment of the inventive concepts.

FIG. 6 is a graph illustrating data for explaining an effect exerted by a method of detecting a defect of a pattern according to example embodiments of the inventive concepts.

Referring to FIG. 6, among 2580 total images, only 340 images are designated as review images R to be reviewed by human intervention while the automated method of detecting defects categorized 5667 images as bad images and 1673 images as good images. Therefore, as compared to a conventional OPC model, the amount of human intervention may be reduced to a level of 13%.

Figure 7:
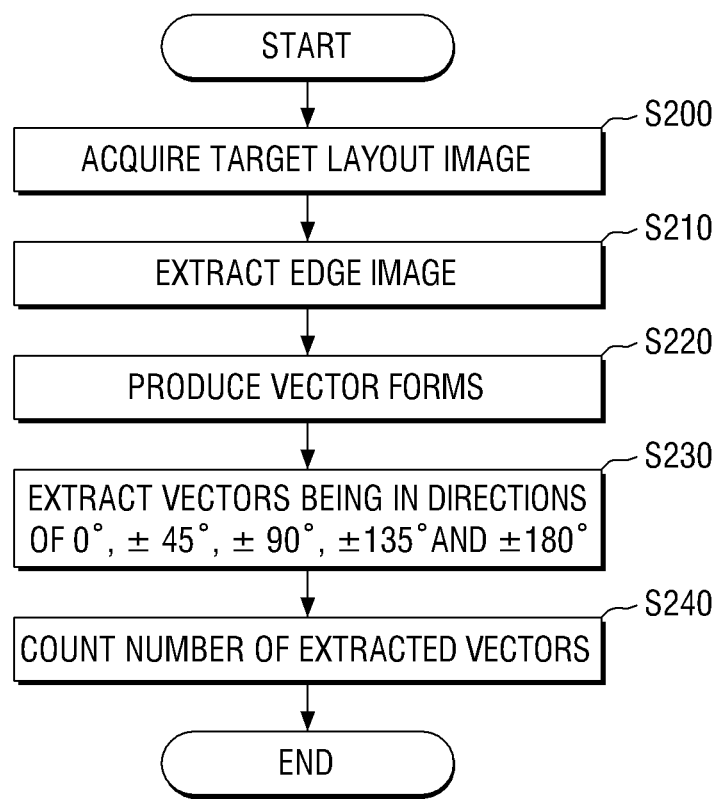
FIG. 7 is a flowchart illustrating a method for detecting a defect of a pattern according to some example embodiments of the inventive concepts.

FIG. 7 is a flowchart illustrating a method of detecting a defect of a pattern according to other example embodiments of the inventive concepts. For the sake of convenient explanation, the same details as those discussed with regard to FIG. 2 will be omitted.

Referring to FIG. 7, a processor, for example, the processor included in the system 4100 discussed below with reference to FIG. 8, may execute a method of detecting a defect of a pattern, as described herein with reference to FIG. 7.

In operation S200, the processor may acquire a pattern image for a pattern. As discussed above with regard to FIG. 2, the pattern image may refer to an image of the pattern that is transferred onto a substrate through a lithography process.

In operation S210, the processor may extract an edge image from the pattern image. As discussed above with regard to FIG. 2, the edge image may be an image extracted by correcting the pattern image and clearly extracting only a contour.

In operation S220, the processor may produce a vector form from the edge image (S220). The vector form may be produced using a vector heading from the center of a pixel to the center of another pixel adjacent to the pixel after partitioning the edge image on the basis of pixels.

In detail, the vector form may be produced by forming a vector heading from a first pixel to a second pixel and vectorizing all vectors in input and output directions with respect to one pixel by vector addition. The first pixel is any selected or chosen pixel and the second pixel may include all pixels adjacent to the first pixel and positioned in up, down, left and right directions of the first pixel. The first pixel may be a black pixel and the second pixel may be a white pixel.

In operation S230, the processor may extract vectors in directions of 0, ±45, ±90, ±135, or ±180 degrees from the vector form, and compare the vectors to detect a defect of the pattern.

In operation S240, the processor may count the number of extracted vectors. Accordingly, it is possible for the processor to detect a defect present in the pattern by counting the number of vectors in a desired (or, alternatively, in a predetermined) direction.

Figure 8:
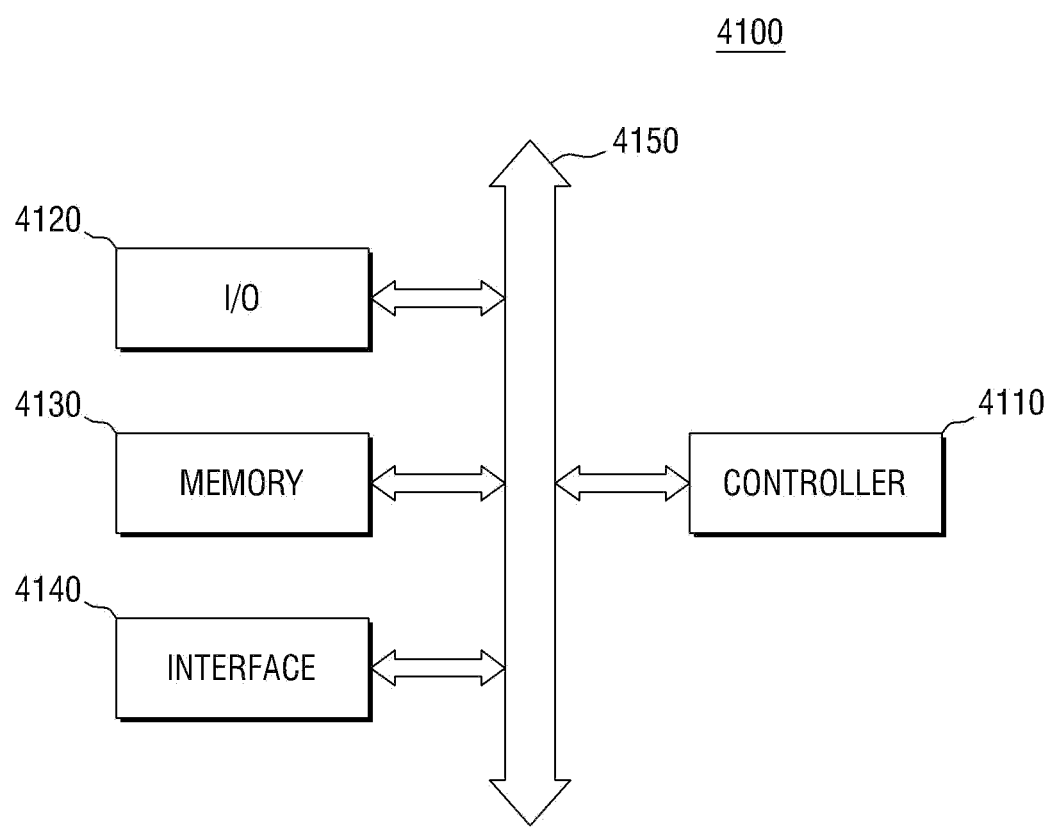
FIG. 8 is a block diagram of an electronic system including semiconductor devices according to some example embodiments of the inventive concepts.

FIG. 8 is a block diagram of an electronic system including semiconductor devices according to some example embodiments of the inventive concepts.

Referring to FIG. 8, the electronic system 4100 may include a controller 4110, an input/output device (I/O) 4120, a memory device 4130, an interface 4140 and a bus 4150.

The controller 4110, the I/O 4120, the memory device 4130, and/or the interface 4140 may be connected to each other through the bus 4150. The bus 4150 may correspond to a path through which data moves.

The controller 4110 may include at least one of a microprocessor, a digital signal processor, a microcontroller, and logic elements capable of functions similar to those of these elements. The processor may be a logic chip, for example, a central processing unit (CPU) or an application-specific integrated circuit (ASIC), that when, executing the instructions stored in the memory 4130, configures the processor as a special purpose machine. For example, the instructions may configure the processor to perform the methods illustrated in FIGS. 2 and 7.

The I/O 4120 may include a keypad, a keyboard, a display device, and so on. The memory device 4130 may store data and/or codes. The interface 4140 may perform functions of transmitting data to a communication network or receiving data from the communication network. The interface 4140 may be wired or wireless. For example, the interface 4140 may include an antenna or a wired/wireless transceiver, and so on.

The memory 4130 may include high-speed DRAM and/or SRAM as the operating memory for improving the operation of the controller 4110. The semiconductor devices according to some example embodiments of the inventive concepts may be incorporated into the memory device 4130 or may be provided as a component of the controller 4110 or the I/O 4120.

The electronic system 4100 may be applied to a personal digital assistant (PDA), a portable computer, a web tablet, a wireless phone, a mobile phone, a digital music player, a memory card, or any type of electronic device capable of transmitting and/or receiving information in a wireless environment.

Figure 9:
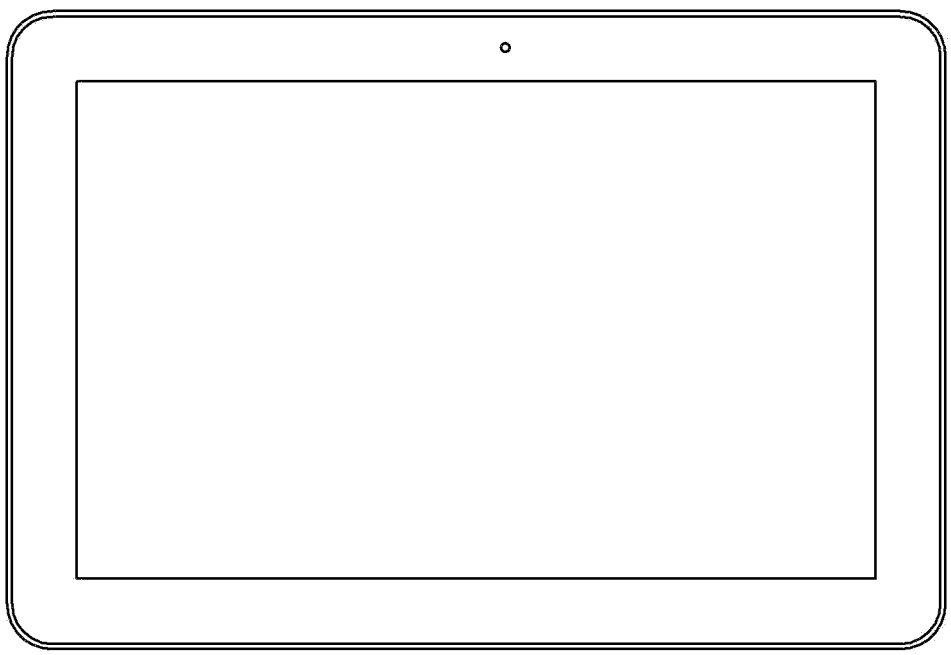
FIGS. 9 and 10 illustrate example semiconductor systems to which semiconductor devices according to some example embodiments of the inventive concepts can be applied.
Figure 10:
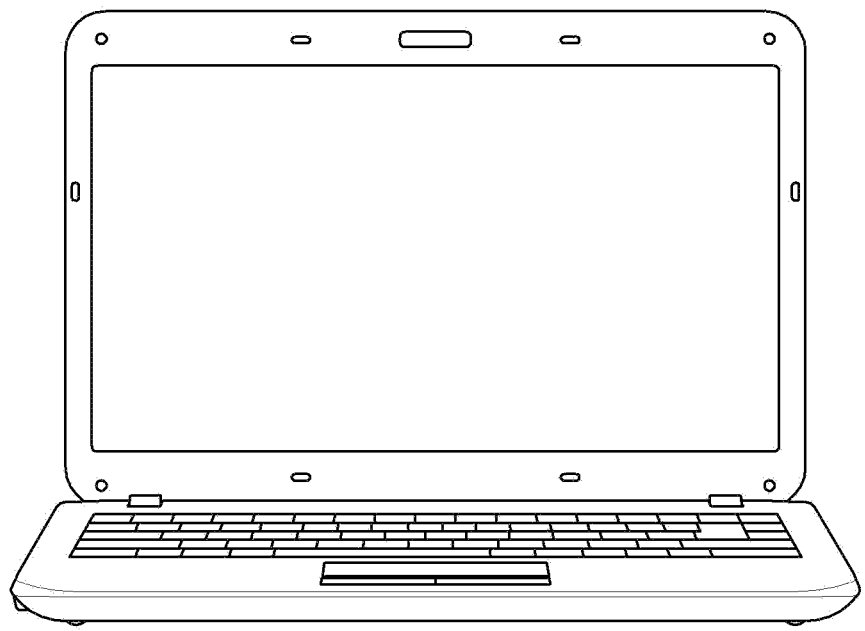

FIGS. 9 and 10 illustrate example semiconductor systems to which semiconductor devices according to some embodiments of the present inventive concept can be applied.

Referring to FIGS. 9 and 10, a semiconductor device according to example embodiments of the inventive concepts may be applied to a tablet PC, as illustrated in FIG. 9 and a notebook computer, as illustrated in FIG. 10. However, the semiconductor devices according to some example embodiments of the inventive concepts may also be applied to other IC devices not illustrated herein.

While example embodiments of the inventive concepts have been particularly shown and described with reference to example embodiments thereof, it will be understood by those of ordinary skill in the art that various changes in form and details may be made therein without departing from the spirit and scope of the inventive concepts as defined by the following claims. It is therefore desired that the example embodiments be considered in all respects as illustrative and not restrictive, reference being made to the appended claims rather than the foregoing description to indicate the scope of the inventive concepts.

What is claimed is:

1. A method of detecting a defect in an actual pattern relative to a target pattern used to form the actual pattern, the method comprising:
   acquiring a target layout image associated with the target pattern, the target pattern being a computer simulated pattern utilized to form the actual pattern onto a substrate;
   acquiring a pattern image associated with the actual pattern formed on the substrate;
   extracting an edge image from the pattern image;
   producing a first vector form based on the target layout image by forming first vectors originating from a first pixel in the target layout image and terminating at a second pixel in the target layout image adjacent to the first pixel, and vectorizing the first vectors using vector addition;
   producing a second vector form based on the edge image by forming second vectors originating from pixels in the edge image corresponding to the first pixel and terminating at pixels in the edge image corresponding to the second pixel, and vectorizing the second vectors using vector addition; and
   comparing the first vector form with the second vector form to detect the defect in the actual pattern relative to the target pattern.

2. The method of claim 1, wherein the first pixel is a black pixel and the second pixel is a white pixel.

3. The method of claim 1, wherein the vectors are in directions of 0, 90, 180, or 270 degrees.

4. The method of claim 1, wherein the comparing of the first vector form with the second vector form comprises:
   counting a number of the vectors in each direction in the first and second vector forms.

5. The method of claim 4, wherein the vectors are in directions of 0, ±45, ±90, ±135, or ±180 degrees.

6. The method of claim 1, wherein the acquiring a target layout image comprises:
   performing a simulation to obtain the target layout image.

7. The method of claim 1, wherein the actual pattern is formed on a photoresist layer of the substrate.

8. The method of claim 1, wherein the pattern image is acquired using a scanning electron microscope (SEM).

9. The method of claim 1, wherein the extracting of the edge image comprises:
   extracting a contour of the pattern image using image correction technology.

10. The method of claim 1, further comprising:
    correcting an optical proximity correction (OPC) model using the first and second vector forms.

11. The method of claim 1, wherein the first vector form and the second vector form are produced by performing vector addition on vectors extending between pixels in the target layout image and the edge image, respectively.

* * * * *